Sept. 9, 1969  E. W. COOKNEY  3,465,887
TORSION BAR SKIMMER

Filed Jan. 3, 1969  6 Sheets-Sheet 1

INVENTOR.
ERNEST W. COOKNEY
BY Arnold Grant
ATTORNEY.

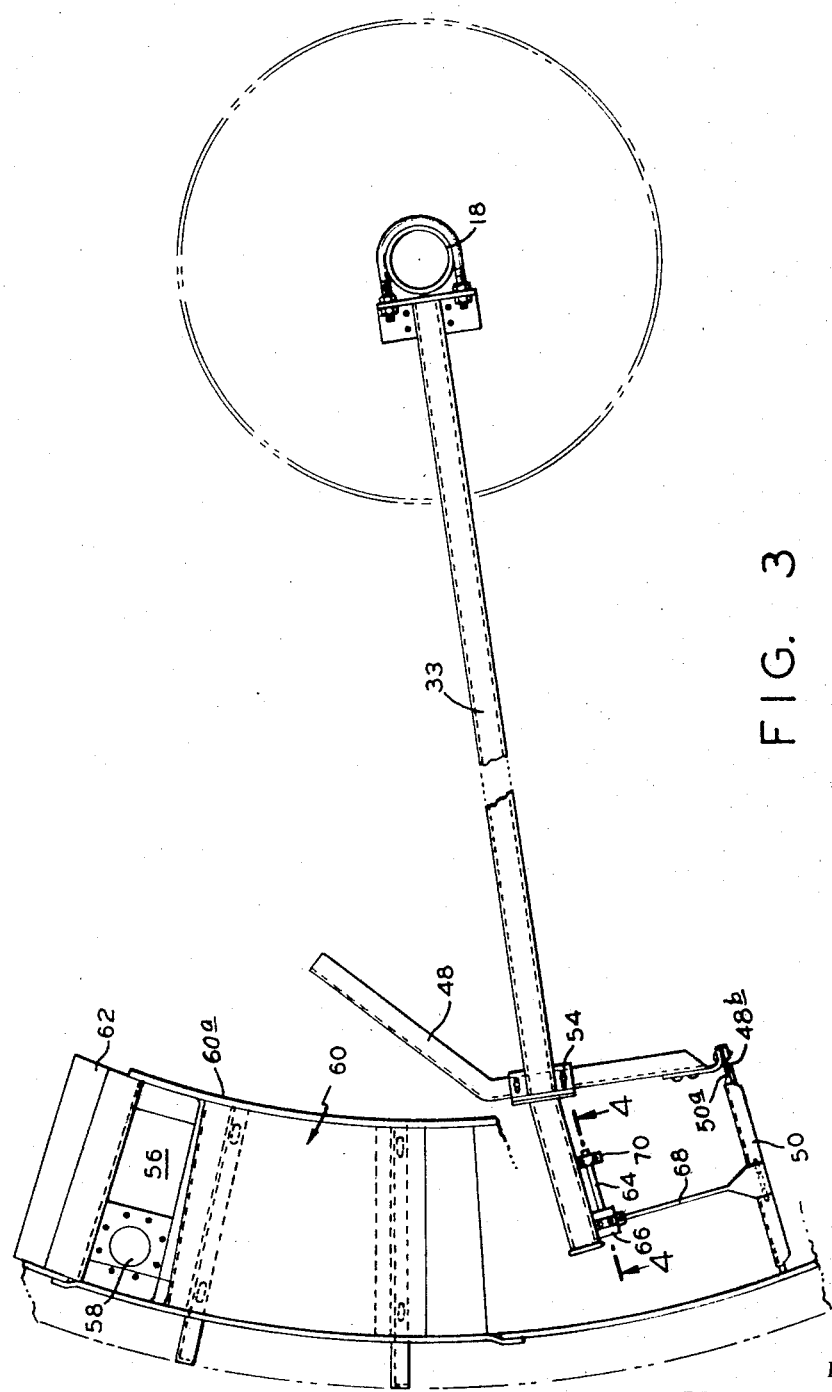

Sept. 9, 1969   E. W. COOKNEY   3,465,887

TORSION BAR SKIMMER

Filed Jan. 3, 1969   6 Sheets-Sheet 3

INVENTOR.
ERNEST W. COOKNEY
BY Arnold Grant
ATTORNEY.

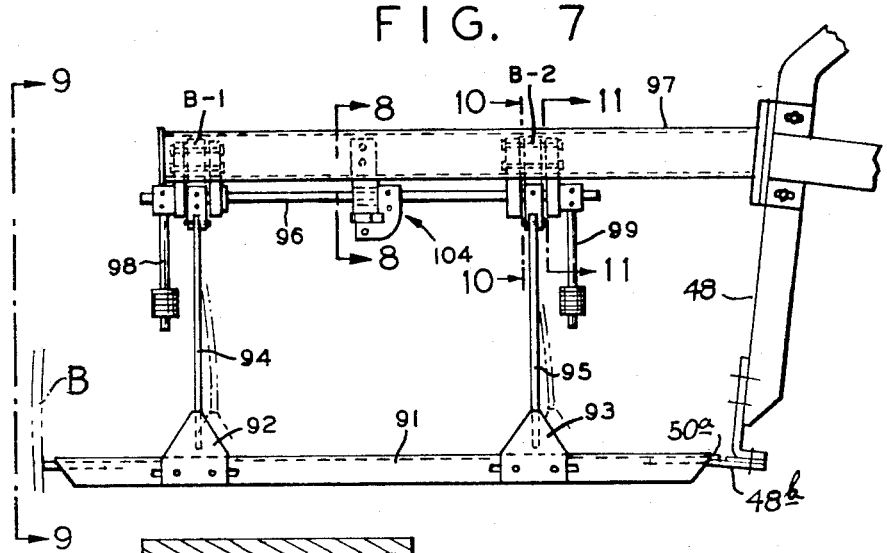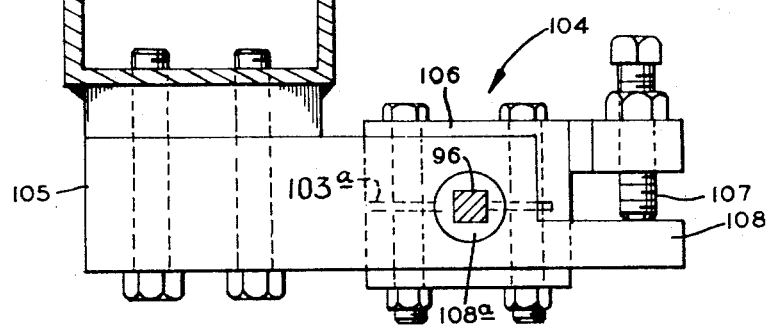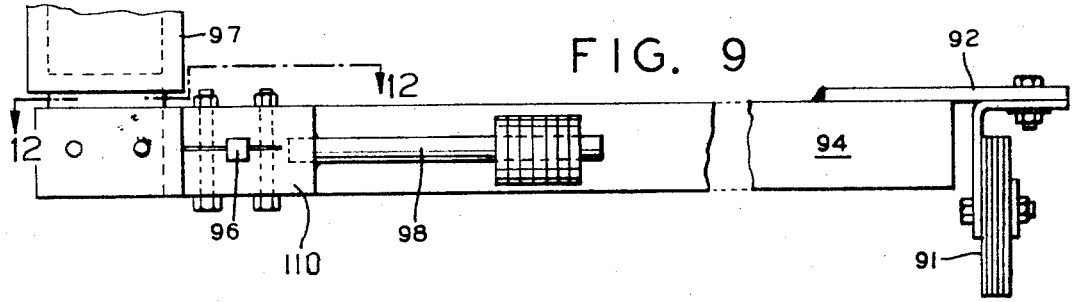

Sept. 9, 1969   E. W. COOKNEY   3,465,887
TORSION BAR SKIMMER
Filed Jan. 3, 1969   6 Sheets-Sheet
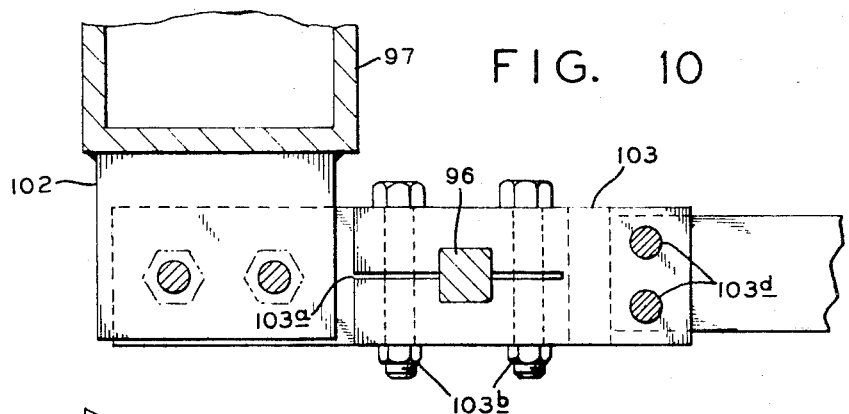
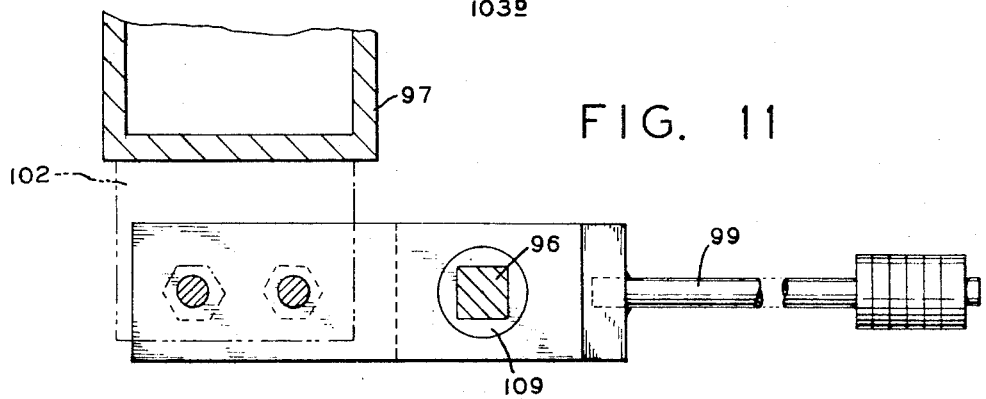
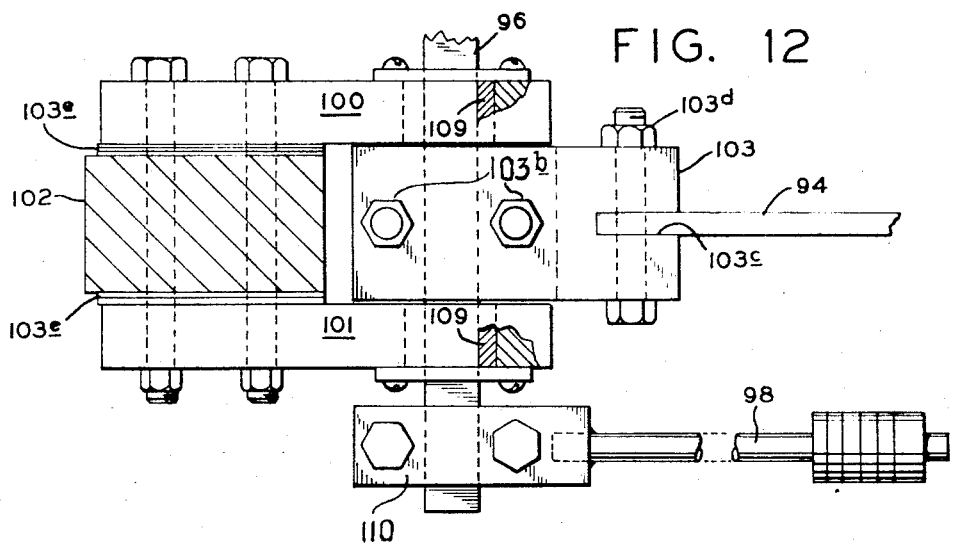
INVENTOR.
ERNEST W. COOKNEY.
BY Theodore M Jablon
ATTORNEY.

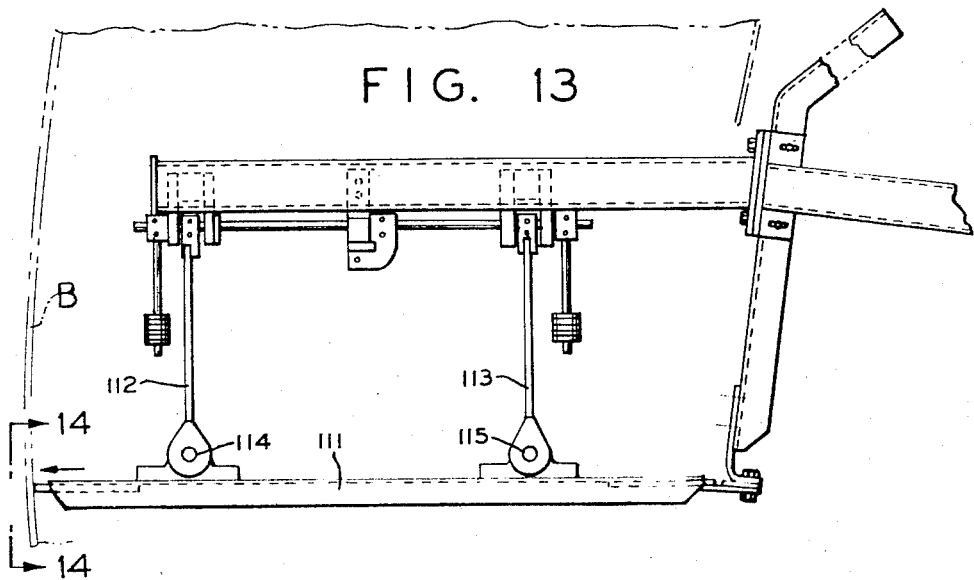
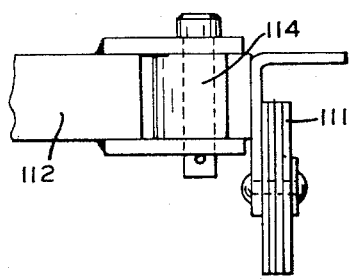
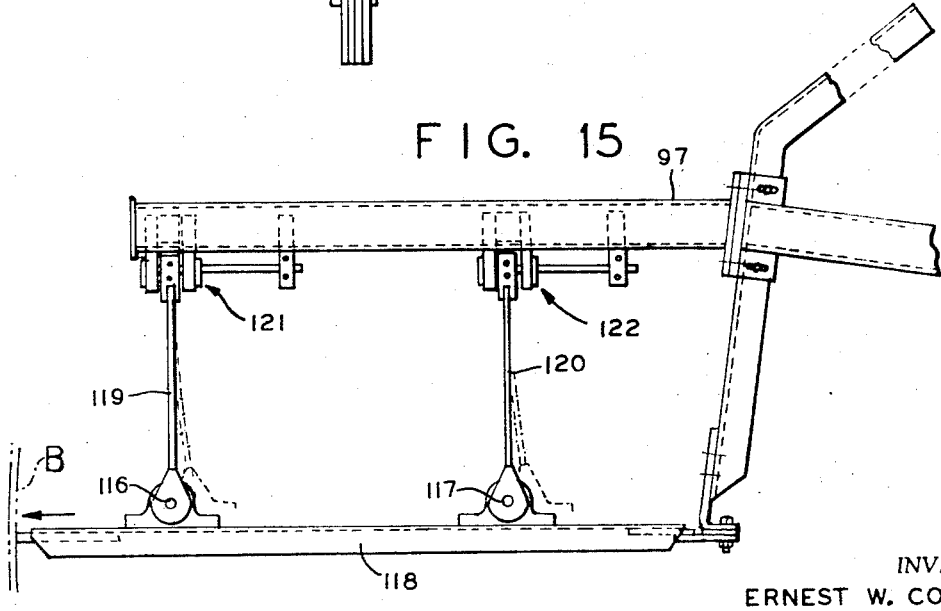

3,465,887
TORSION BAR SKIMMER
Ernest W. Cookney, Clearwater, Fla., assignor to Dorr-Oliver Incorporated, Stamford, Conn., a corporation of Delaware
Continuation-in-part of application Ser. No. 666,059, Sept. 7, 1967. This application Jan. 3, 1969, Ser. No. 796,941
Int. Cl. B01d 21/06
U.S. Cl. 210—525                        19 Claims

ABSTRACT OF THE DISCLOSURE

A rotating skimmer device cooperating with the peripheral scum baffle in a settling tank, wherein the radially extending skimmer blade has one or more arms connecting it to a horizontal rotating support arm, so that the skimmer blade and arms are swingable about a horizontal axis which connecting arm or arms are horizontally resiliently deflectable for maintaining the skimmer blade in contact with the scum baffle during the rotation of the supporting arm.

---

This is a continuation-in-part of Ser. No. 666,059, filed Sept. 7, 1967, and now abandoned.

The present invention relates to skimmers for culling and removing scum from liquid treatment tanks. More particularly the present invention relates to an improved and simplified design for a scum skimmer having a skimming blade carried by, or rotating with, a raking mechanism.

In liquid treatment tanks, of the type shown for example in U.S. Patent No. 2,611,489 to Scott, the liquid to be clarified is introduced into the center of the tank, the collected solids are raked along and removed from the bottom of the tank and the clarified liquid overflows a discharge launder at the periphery of the tank. Particularly in the sanitary field, a material, known in the art as "scum" and composed of foamed particles too light to settle with the remainder of the solids, floats on or near the surface of the tank contaminating the already clarified liquid. This scum is collected and prevented from overflowing with the clarified liquid by a circular scum baffle, intermediate the feedwell and the peripheral discharge launder, and a cooperating scum skimmer. The skimmer has a radially extending blade which is mounted above the rotating raking structure on a skimming arm in abutting relationship with the concentrically disposed scum baffle. As the rake rotates in the tank, the blade moves along the surface of the liquid scraping the scum from the baffle and transporting it over a set of access ramps, to a raised collection and discharge trough.

One of the major problems in the construction of this type of liquid treatment unit is that of concentricity between the rotating scum skimmer and the intermediate scum baffle. Any discrepancies in concentricity places a corresponding and proportional longitudinal stress on the skimming blade and its support structure. For a similar reason, it is imperative that the interior surface of the scum baffle be as smooth as possible to prevent non-scrapable obstructions or protrusions from placing additional longitudinal loads on the skimming blade. Thus the design of the skimming blade and its support structure must take into account the longitudinal stresses as well as the lateral stresses caused by the skimming blade riding up and down the access ramps. Scott, in the above-mentioned U.S. Patent No. 2,611,489, approached the problems of lateral and longitudinal kinematics seperatly, i.e., the entire skimming structure was mounted on a longitudinally extending pivot pin to accommodate lateral deflections and a set of nonparallels links was pivotally connected by a series of two transverse springurged bearings, intermediate the skimming blade and the longitudinal pivot pin, to accommodate longitudinal deflections. This construction and others like it, while they do serve their intended function of accommodating both lateral and longitudinal movement, are cumbersome, inordinately heavy, and, because of the number of parts and complexity of their interrelationship, prone to breakdown.

It is therefore an object of the present invention to design a simple, lightweight and sturdy scum skimmer and support structure which is capable of accommodating both lateral and longitudinal movements.

To this end the invention provides a skimming device wherein the skimmer blade has one or more arms connecting it to the rotating support arm so that the skimmer blade and arms are swingable about a horizontal axis which connecting arm or arms are horizontally resiliently deflectable for maintaining the skimmer blade in contact with the scum baffle during rotation of the supporting arm. In one embodiment the skimming blade is mounted on the rotating skimmer arm through the intermediary of an interrelated bearing, torsion bar and longitudinally yieldable member connected either between the torsion bar and the skimming blade or between the skimming blade and a transverse connection or connecting arm or arms from the skimming blade to the torsion bar.

The torsion bar is accepted at one end in a bearing mounted bushing and the skimming blade is connected, through the bearing, to the torsion bar by a radially yieldable connecting member. In this manner, lateral movements of the skimming blade, occasioned by the skimming blade overriding the access and egress ramps of the scum discharge trough, are transferred through the connecting member or arm to the torsion bar and accommodated by the torsion bar twisting in the bearing. Longitudinal movements of the skimming blade, caused, for example, by protrusions on the scum baffle or imperfections in the concentricity of the scum baffle, relative to the center of rotation of the rake, are accommodated by the connecting member, which is designed to deflect in a radial direction about its connection with the bearing.

According to another embodiment of this invention the end of the connecting member is slideably received in an elongated slot in the skimming blade and a longitudinally extending compression spring is interconnected between the skimming blade and the connecting member. Longitudinal movements of the skimming blade are, thus, absorbed by the interaction of the compression spring and the skimming blade sliding relative to the fixed connecting member.

The subject matter which applicant regards as his invention is particularly pointed out and distinctly claimed in the concluding portion of this specification. The invention, however, as to its organization and method of operation together with other objects and advantages thereof will best be understood by reference to the following description taken in conjunction with the accompanying drawings in which:

FIGURE 3 is an enlarged plan view, with parts removed for clarity of showing, of one embodiment of the improved scum skimming device;

FIGURE 7 is the plan view of another embodiment having the skimmer blade rigidly connected to a pair of deflectable arms for double-curved deflection of the arms.

FIGURE 8 is a detail cross-sectional view taken on line 8—8 in FIGURE 7, showing a stop device defining the lower position of the skimmer blade.

FIGURE 9 is an end view taken on line 9—9 in FIGURE 7.

FIGURE 10 is a detail cross-sectional view taken on line 10—10 in FIGURE 7.

FIGURE 11 is a detail cross-sectional view taken on line 11—11 in FIGURE 7.

FIGURE 12 is a detail cross-sectional view taken on line 12—12 in FIGURE 9.

FIGURE 13 is the plan view of an embodiment similar to the construction shown in FIGURE 7, except that the arms are pivotally connected to the skimmer blade, for single curved deflection of the arms.

FIGURE 14 is a detail end view taken on line 14—14 in FIGURE 13, showing the pivotal connection.

FIGURE 15 is a plan view of an embodiment similar to FIGURE 13 wherein each of the two connecting arms is mounted on a separate torsion bar device, preventing downward bias for the skimmer blade.

Figure 2:
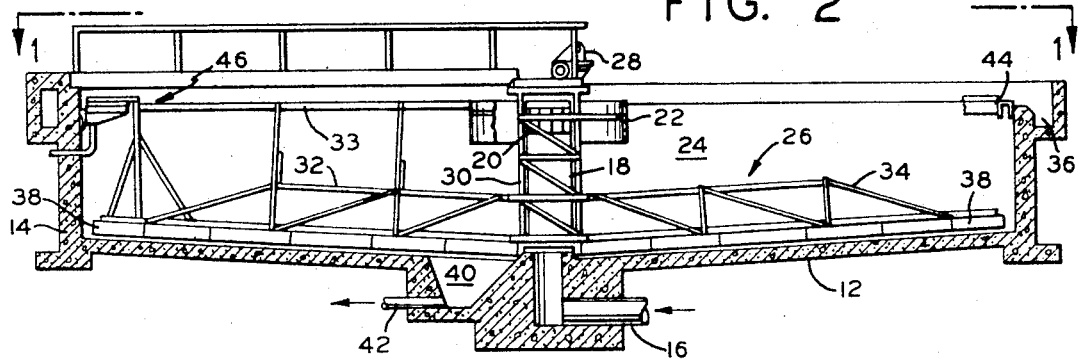
FIGURE 2 is a sectional view of the tank along the line 2—2 of FIGURE 1.
Figure 1:
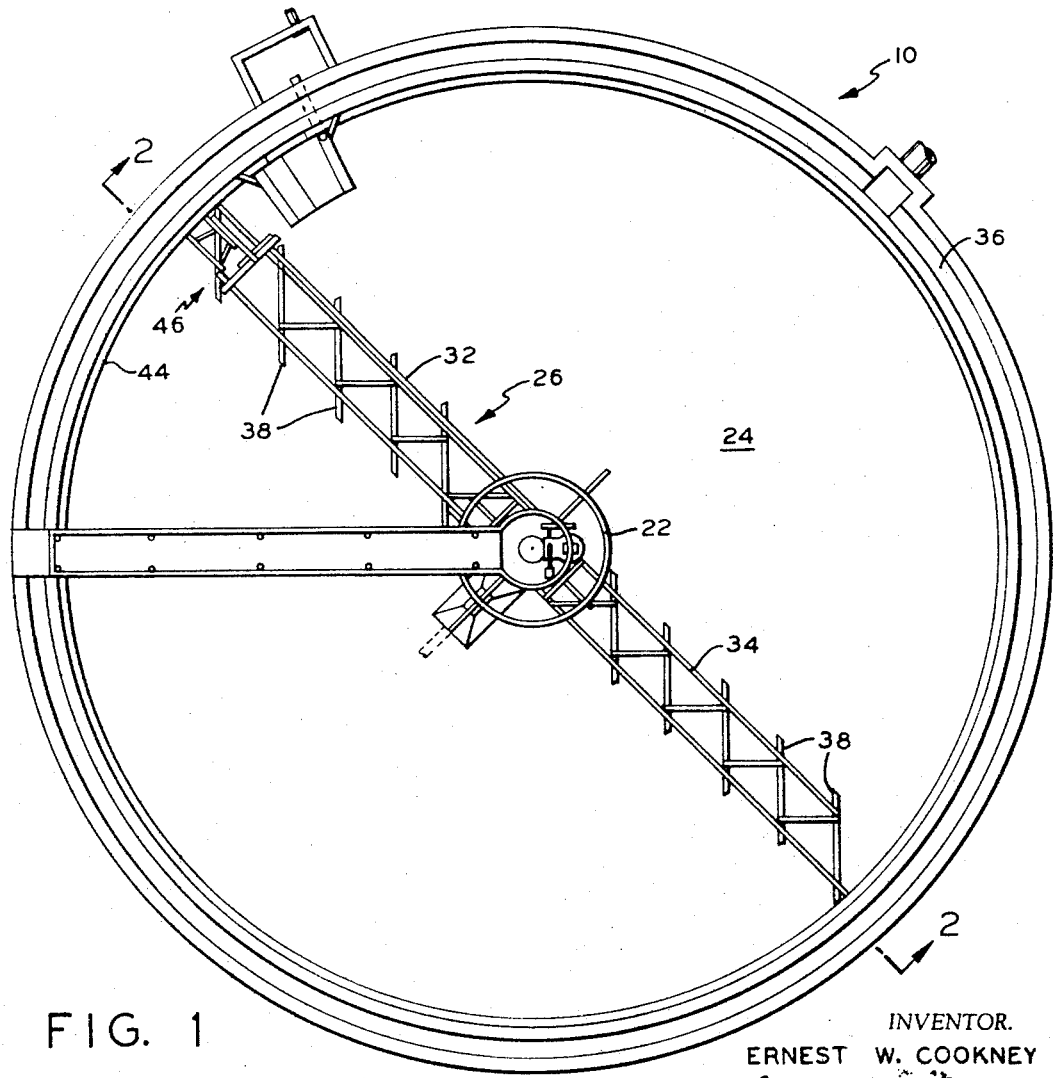
FIGURE 1 is a plan view of a liquid treatment tank having rotary sediment raking mechanism in association with the improved scum skimming device.

Referring now to FIGURES 1 and 2 there is shown a liquid treatment tank 10 having a bottom 12 and an upstanding circumferential wall 14. An inlet conduit 16 feeds solids-carrying liquid centrally, up through the bottom of the tank and into a hollow central pier 18. The feed liquid passes through laterally extending openings 20 in the top edge of the pier 18 and flows past the lower edge of a cylindrical baffle 22, into the main portion of the tank 24.

A rotary sediment raking structure 26, driven by motor 28, has a central support frame 30, which surrounds central pier 18, and a pair of radially extending rake arms 32, 34. In the relatively quiescent environment of the tank the solids settle to the bottom, for collection and the clarified liquid flows outwardly toward the periphery, to overflow launder 36. The solids are conveyed inwardly, along the bottom of the tank by the rotation of the raking structure 26 and the depending rake blades 38. A solids sump 40 receives the raked solids and transfers them to a conduit 42 for final discharge from the tank 10.

Particularly in the sanitary field, a light frothy material, known in the art as "scum," floats on or near the liquid surface contaminating the already clarified liquid. This scum is prevented from overflowing, with the clarified liquid, into the launder 36 by the cooperative action of a peripheral raised scum baffle 44, which is concentric with and supported by the tank wall 14 and a scum skimmer 46 attached to a rotating support arm 33. The scum gathers along the inner wall of the baffle 44 where it is as will now be explained, collected and discharged from the tank by the scum skimmer 46.

Figure 4:
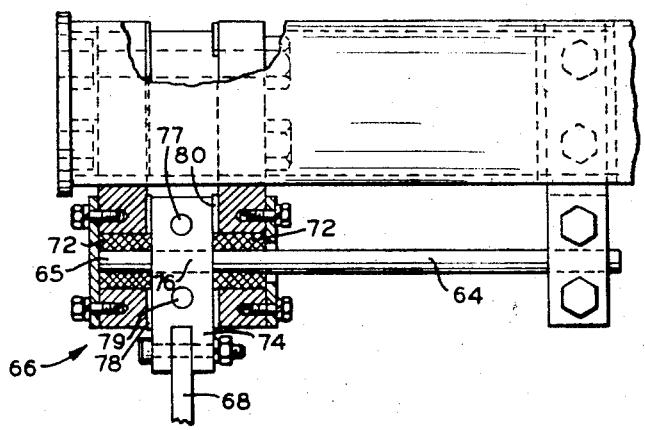
FIGURE 4 is an enlarged plan view with parts in section taken along the line 4—4 of FIGURE 3.
Figure 5:
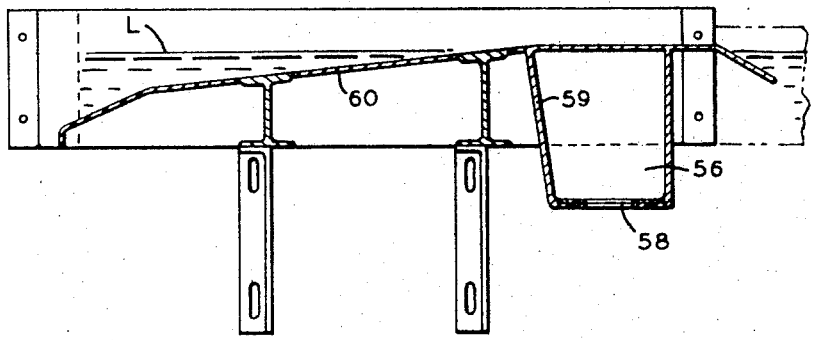
FIGURE 5 is an enlarged elevational view of the scum collecting trough and its access and egress ramps.

Referring now to FIGURES 3-5, a pair of rubber edged skimming blades 48, 50, one extending radially from scum baffle 44 inwardly toward center pier 18 and the other transversely, relative to the tank, ride in the clarified liquid just below the surface thereof to cull the collected scum before them. Transverse blade 48 is bolted to rotating support arm 33 by depending bracket 54 and is angularly shaped, extending from its initial direction, parallel to the tank wall, inwardly toward the center pier 18, to increase the area swept by the blades. At the trailing end of the skimmer blade 48 is secured a flexible flap 48b of rubber or like material overlapping and contacting a like flexible flap 50a on blade 50. This provides a scum tight joint between skimmer blades 48 and 50 but permits these blades to pass respectively inside and outside of inner wall 60a of ramp 60 and permits radial movement of the blade 50 relative to blade 48.

A scum collecting through 56 having discharge 58 and raised side walls 59 extending above the liquid level L, is positioned in the tank 10 along the inner wall of the scum baffle 44. Communication to the scum receptacle is provided by an access ramp 60 and an egress ramp 62 which rise from and descend into the body of clarified liquid. Thus the path of rotation of the skimming blade 50 contains a period of lateral deflection wherein the blade rises up ramp 60, travels along the top edge of side walls 59, and down ramp 62. The path of skimming blade 50 also contains periods of longitudinal deflection, caused, for example, by imperfections in the concentricity between scum baffle 44 and rotating support arm 33 or by protrusions along the interior wall of scum baffle.

In order to accommodate these lateral and longitudinal movements of the skimming blade 50 Applicant mounts the blade to the rotating support arm 33 through a torsion bar 64, a straddle mount bearing 66 and a connecting arm 68. The torsion bar 64 is fixedly attached at one end thereof to the arm 33 by depending bracket 70 and is accepted, at its other end, bearing 66. Bearing 66 has two separate, spaced apart bushings 72, each of which has a square cut passage therethrough for the squared end 65 of torsion bar 64 and each of which is dimensioned to have a "running fit" in the bearing. The connecting arm 68 has an enlarged head 74 which is accepted into the bearing 66 between the spaced bushings 72. A square and saw cut passage 76 is cut through the enlarged head 74 to receive the torsion bar 64 so that lateral movements of the connecting arm 68 will be transmitted directly to the torsion bar and cause the torsion bar to twist in the bearing. The opposing sides of the saw-cut enlarged head 74 are clamped together and over the torsion bar by a set of bolts 77, 79. The connecting arm 68 is joined, at its foot to the skimming blade 50, and is designed to be radialy yieldable, i.e., longitudinal movements of the skimming blade will cause the connecting arm to yield about its connection in the bearing to accommodate the deflection. A set of thrust washers 78, 80, one on either side of the enlarged head 74, absorbs the sideways thrust of the connecting arm and prevents transfer of the bending stress to the torsion bar.

Figure 6:
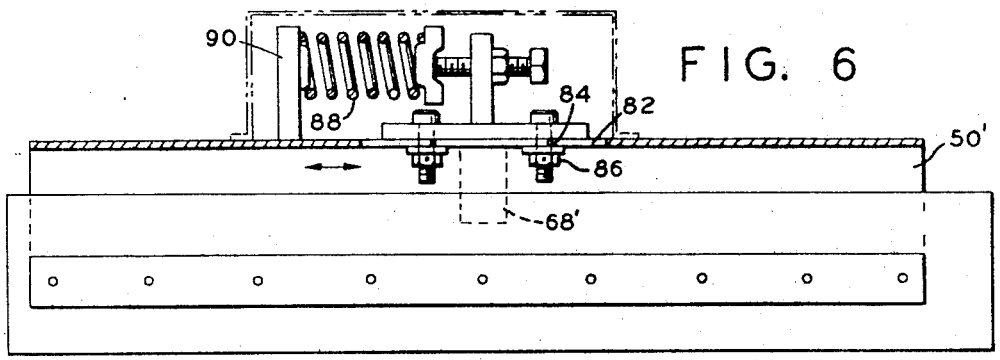
FIGURE 6 is an elevational view, with parts in section, showing a second embodiment of the improved scum skimming device.

In Applicant's second embodiment, shown in FIGURE 6, the longitudinal deflections of the skimming blade 50' are accommodated by the blade sliding relative to the fixed connecting arm 68'. An elongated slot 82 is provided in the skimming blade along the line of connection between the blade and the arm. The connecting arm, in turn, has a depending threaded neck 84 which extends through the slot and a nut 86 received on the neck to join the connecting arm and the skimming blade. Thus if a longitudinal force is impressed on the blade, it can slide, along its slot, relative to the fixed connecting arm 68'. A compression spring 88 is biased between the connecting arm and an upstanding post 90 to maintain the skimming blade in abutting relationship with the scum baffle 44'.

Lateral movements of the skimming blade 50 are transferred from the connecting arm 68 to the torsion bar 64 and accommodated by the torsion bar twisting in the bearing 66. Longitudinal forces impressed on the skimming blade 50 can be accommodated either by the connecting arm 68 deflecting about its connection in the bearing 66 in the same manner as a leaf spring; or, by the skimming blade 50' sliding relative to the fixed connecting arm 68'.

Other embodiments as shown in FIGURES 7 to 15 of the skimming device of this invention have a skimmer blade connected to the outer ends of a pair of parallel horizontal arms which in turn are mounted on the rotating support arm for movement about a horizontal axis which is substantially parallel to the skimmer blade. The skimmer arms are resiliently laterally deflectable for maintaining operating contact with the peripheral scum baffle of the settling tank. Means are provided to bias the skimmer blade downwardly against a stop.

Accordingly, in the embodiment of FIG. 7 the skimmer device, a skimmer blade 91 has rigid connections 92 and 93 respectively with a pair of resiliently deflectable arms 94 and 95 which in turn are fixed to a horizontal shaft 96 rotatable in a pair of bearings (B–1 and B–2) fixed to the rotating support arm 97. Fixed to the ends of shaft 96 outwardly adjacent to the respective bearings B–1 and B–2 are weighted arms 98 and 99 providing downward bias for the skimmer blade.

The shaft is of square cross-section and has the arms 94 and 95 clamped thereto in the manner shown in FIGS. 10, 11, 12. The bearings B–1 and B–2 each have a pair of side members 100 and 101 bolted to a block 102 fixed to the underside of the support arm 97 and providing the bearing support for the squared hub end 103 of the skimmer arms, all in the manner shown in FIGS. 10, 11, 12. The part 103 has a horizontal slot 103a and bolts 103b for clamping the part to the shaft and a vertical slot 103c are shown interposed between the side members 100 and 101 and block 102, in order that the squared hub 103 of the skimmer arm may be accommodated properly between members 100 and 101.

A stop device 104 limits the downward movement of the skimmer blade, comprising a bearing block 105 fixed to the underside of the support arm 97, and a lug member 106 fixed to the shaft adjacent to the bearing block, and having a set screw 107 engaging an extension or projection 108 of the bearing block, and defining the downward stop position of the skimmer blade. The lug member 106 is fixed or clamped to the square shaft in the same manner as the various arms that move with the shaft. The shaft has a bearing sleeve 108a for rotating in the bearing block 105.

The arms 94 and 95 in this embodiment being resiliently deflectable in the manner of the double curve shown dot-and-dash in FIG. 7, maintain operating contact with peripheral scum baffle B. The skimmer arms are turnable together with the shaft which has bearing sleeves 109 for rotating it in the bearing B–1 and B–2. The weighted arms 98 and 99 are fixed to shaft by means of a squared and slotted hub member 110, substantially in the same manner as the skimmer arms 94 and 95 are fixed or clamped to the square cross-section of the shaft.

Another embodiment of the skimmer device in FIG. 13 is substantially identical to that of FIG. 7 described above, except for the fact that the skimmer blade 111 is connected to skimmer arms 112 and 113 by means of pivotal connections 114 and 115 respectively. The skimmer arms are laterally deflectable, and due to the pivotal connections are capable of simple-curved deflection as indicated in dot-and-dash (see FIG. 15). As in the previously described embodiments, the resilient deflection of the skimmer arm or arms maintains operating contact between the skimmer blade and the peripheral scum baffle of the sedimentation tank.

The embodiment of the skimmer device in FIG. 15 again is similar to that of FIG. 13, especially with respect to the pivotal connections 116 and 117 between the skimmer blade 118 and the skimmer arms 119 and 120. However, separate torsion bar devices 121 and 122 are provided for mounting the two connecting arms upon the support arm 97, in the manner shown and described above in connection with the embodiment of FIG. 4. The torsion bars in these devices provide downward bias for the skimmer blade against the scum delivery ramp or against a stop.

I claim:

1. In a continuously operating clarifier tank having peripheral overflow means, and having a peripheral scum baffle surrounded by said overflow means, a scum skimming mechanism which comprises a scum discharge ramp disposed laterally adjacent to the inner face of said scum baffle, and having a scum receiving trough at the top and scum delivery duct means leading therefrom, and a rotary scum skimming device cooperating with said ramp, and comprising a support member mounted for rotation about the vertical axis of said scum baffle, and in a plane above said ramp, a torsion rod extending substantially radially to the scum baffle, and having one end connected to said rotary support member fixed against rotation, a pair of spaced-apart bearings fixed on said support member, for supporting the opposite end of said torsion rod in a manner to allow for torsional deformation of the rod when torque is applied to said opposite end, a skimmer arm fixed to said torsion rod between said bearings and adjacent thereto, and extending rearwardly from the trailing side of said torsion rod, a skimmer blade connected to the trailing end of the skimmer arm substantially parallel to said torsion rod, said skimmer arm and said skimmer blade being constructed and arranged so as to normally provide operating contact between said scum baffle and the adjacent end of the skimmer blade, while allowing said adjacent end to resiliently yield in following the inner contour of said scum baffle, and allowing said skimmer blade to engage and travel over said ramp for scum delivery into said trough incident to the rotation of said support member about said vertical axis, and incident to the torsional deformation of said torsion rod due to said skimmer blade travelling up said ramp, with said two bearings absorbing any bending forces exerted upon said skimmer arm by said skimmer blade.

2. The mechanism according to claim 1, wherein said skimmer blade is fixed to said skimmer arm, and said skimmer arm is laterally resiliently deflectable so as to provide yieldability of the skimmer blade in its longitudinal direction.

3. The mechanism according to claim 1, wherein said skimmer arm is rigid, and said skimmer blade is movably mounted thereon so as to provide yieldability in its longitudinal direction.

4. The mechanism according to claim 1, wherein said torsion rod is of square cross-section at least along the length between the outer faces of said bearing, wherein the skimmer arm has clamping means fitted to the square cross-section of said torsion rod, whereby said skimmer arm is fixed to said rod, and wherein each of said bearings has a bushing fitted therein for rotation, and each bushing is fitted to the square configuration of the torsion rod.

5. The mechanism according to claim 4, wherein a thrust washer is provided upon the inner end of each said bushing, and means are provided for securing each bushing against outward axial displacement.

6. The mechanism according to claim 1, wherein said bearings are fixed to the underside of said support member.

7. In a continuously operating clarifier tank having peripheral overflow means, and having a substantially circular scum baffle surrounded by said overflow means, a scum skimming mechanism which comprises a scum discharge ramp disposed laterally adjacent to the inner face of said scum baffle, and having a scum receiving trough at the top end of the ramp and scum delivery duct means leading therefrom, a skimmer arm in the form of a resiliently horizontally deflectable member extnding rearwardly from the trailing side of said support member;

bearing means for mounting one end of said skimmer arm on said support member, whereby said arm is movable about a horizontal axis extending substantially radially to said scum baffle, said bearing means being adapted to adsorb the bending moment from a force acting transversely horizontally on said deflectable skimmer arm, a skimmer blade connected to the trailing end of the skimmer arm substantially parallel to said horizontal axis, in such a manner as to cause said skimmer blade to follow the contour of said peripheral scum baffle incident to deflection of said skimmer arm, during the rotation of said support member.

8. The mechanism according to claim 7, with the addition of bias means causing said skimmer blade to have pressure contact with said ramp.

9. In a continuously operating clarifier tank having peripheral overflow means, and having a substantially circular scum baffle surrounded by said overflow means;

a scum skimming mechanism which comprises a scum discharge ramp disposed laterally adjacent to the inner face of said scum baffle and having a scum receiving trough at the top end of the ramp and scum delivery duct means leading therefrom;

and a rotary scum skimming device cooperating with said baffle and said ramp in collecting and delivering scum into said trough, which device comprises a support member mounted for rotation about the vertical axis of said scum baffle, and in a plane above said ramp;

a pair of skimmer arms etxending rearwardly from the trailing side of said support member, spaced horizontally from one another, said arms being constructed and arranged so as to be horizontally deflectable by resilient deformation;

a skimmer blade connected to the trailing ends of said pair of skimmer arms, extending substantially radially to said scum baffle, said skimmer arms being tension by deflection, so as to cause said skimmer blade to follow the peripheral contour of said scum baffle incident to deflection of said skimmer arms, during rotation of said support member;

bearing means for mounting the opposite ends of said skimmer arms on said support member, whereby said arms are swingable together about a horizontal axis extending substantially radially to said scum baffle, thus allowing said skimmer blade to engage and travel over said ramp for scum delivery into said trough incident to the rotation of said support member about said vertical axis, said bearing means being constructed and arranged so as to absorb the bending movement from horizontal transverse forces deflecting said skimmer arms.

10. The scum skimming mechanism according to claim 9 wherein said skimmer blade is rigid and continuous with the trailing ends of said pair of skimmer arms.

11. The scum skimming device according to claim 9, wherein said skimmer blade has pivotal connections with the trailing ends of said pair of skimmer arms.

12. The scum skimming device according to claim 9, wherein said bearing means comprise a horizontal shaft, a pair of bearings supporting said shaft, and means for fixing the inner ends of said skimmer arm to said shaft.

13. The scum skimming device according to claim 12, with the addition of a stop device effective between said support member and said shafts and located intermediate said bearings and defining a downward stop portion of said skimmer blade.

14. The scum skimming device according to claim 12 with the addition of stop means for defining a downward stop position of said skimmer blade, and at least one weighted arm fixed on said shaft, providing downward bias for said skimmer blade.

15. The scum skimming device according to claim 12, wherein said bearing means comprise for each said skimmer arm a separate torison rod extending substantially radially to the scum baffle, and having one end connected to said rotary support member fixed against rotation, a pair of spaced apart bearing blocks on said support member, for supporting the opposite end of said torsion rod in a manner to allow for torsional deformation of the rod when torque is applied to said opposite end thereof by a skimmer arm fixed to said end and confined between said bearing blocks.

16. In a clarifier tank having peripheral overflow means, and having a substantially circular scum baffle surrounded by said overflow means;

a scum skimming mechanism which comprises, a circumferentially extending scum discharge ramp disposed adjacent to the inner face of said scum baffle and having a scum receiving trough at the top end of the ramp;

and a rotary scum skimming device cooperating with said baffle and said ramp in collecting and delivering scum into said trough, which device comprises a support member mounted for rotation about the vertical axis of said scum baffle, a skimmer arm extending rearwardly from the trailing side of said support member, said arm consisting of a leaf spring arranged in a generally vertical plane and constructed and arranged so as to be deflectable by resilient deformation in a horizontal direction only, a skimmer blade connected to the trailing end of the skimmer arm, extending substantially radially to said scum baffle, with its outer end engaging said baffle, means for mounting the leading end of said skimmer arm on said support member for swinging movement whereby said arm is swingable about a horizontal axis which axis extends substantially radially to said scum baffle, thus allowing said skimmer blade to engage and travel up over said ramp for scum delivery into said trough incident to the rotation of said support member about said vertical axis, said mounting means being constructed and arranged so as to secure the leading end of said arm against horizontal swinging movement whereby deflection of said arm maintains the outer end of the skimmer blade in engagement with said baffle despite radial variations therein.

17. The scum skimming mechanism according to claim 16 wherein a second arm radially spaced from the first mentioned arm and generally parallel thereto is similarly connected to the skimmer blade, and similarly mounted on said support member.

18. The scum skimming device according to claim 16 which includes means biasing the said arm and blade downwardly toward scum skimming position after passing said ramp, and a stop device for stopping said arm with the skimmer blade in said position.

19. The scum skimming device defined in claim 16 in which said skimmer arm mounting means comprises a generally radially extending torsion bar one end of which is fixedly secured on said support member and the other end of which is fixedly secured to the leading end of said arm so as to bias the skimmer blade downwardly against said ramp and into skimming position after passing the ramp.

References Cited
UNITED STATES PATENTS

| | | | |
|---|---|---|---|
| 2,611,489 | 9/1952 | Scott | 210—528 |
| 3,314,547 | 4/1967 | Kivell | 210—528 X |

JAMES L. DeCESARE, Primary Examiner

U.S. Cl. X.R.

210—528